(12) United States Patent
Grosset et al.

(10) Patent No.: US 8,447,753 B2
(45) Date of Patent: May 21, 2013

(54) SEMANTIC VERIFICATION OF MULTIDIMENSIONAL DATA SOURCES

(75) Inventors: Robin N. Grosset, Ottawa (CA); Jose Vazquez, Piscataway, NJ (US); Yu Zou, Piscataway, NJ (US)

(73) Assignee: International Business Machines Corporation, Armonk, NY (US)

( * ) Notice: Subject to any disclaimer, the term of this patent is extended or adjusted under 35 U.S.C. 154(b) by 259 days.

(21) Appl. No.: 12/959,552

(22) Filed: Dec. 3, 2010

(65) Prior Publication Data

US 2011/0137937 A1 Jun. 9, 2011

(51) Int. Cl.
*G06F 17/30* (2006.01)

(52) U.S. Cl.
USPC .......................................... 707/713

(58) Field of Classification Search
USPC ................................. 707/713–721
See application file for complete search history.

(56) References Cited

U.S. PATENT DOCUMENTS

| | | | | |
|---|---|---|---|---|
| 5,742,806 A * | 4/1998 | Reiner et al. | ............................ | 1/1 |
| 6,473,750 B1 * | 10/2002 | Petculescu et al. | ............ | 707/600 |
| 7,363,289 B2 * | 4/2008 | Chaudhuri et al. | ................... | 1/1 |
| 7,395,258 B2 * | 7/2008 | Altinel et al. | .......................... | 1/1 |
| 7,739,262 B2 * | 6/2010 | Larson et al. | ................. | 707/713 |
| 7,779,031 B2 * | 8/2010 | Grosset et al. | ................ | 707/770 |
| 7,831,620 B2 * | 11/2010 | Barsness et al. | ............. | 707/790 |
| 7,853,624 B2 * | 12/2010 | Friedlander et al. | .......... | 707/803 |
| 7,877,381 B2 * | 1/2011 | Ewen et al. | ................... | 707/719 |
| 7,933,894 B2 * | 4/2011 | Friedman et al. | ............. | 707/718 |
| 7,958,113 B2 * | 6/2011 | Fan et al. | ...................... | 707/718 |
| 8,065,319 B2 * | 11/2011 | Ding et al. | .................... | 707/769 |
| 2003/0158842 A1 * | 8/2003 | Levy et al. | ........................ | 707/3 |

\* cited by examiner

*Primary Examiner* — Jorge A Casanova
(74) *Attorney, Agent, or Firm* — Steven M. Greenberg, Esq.; Carey, Rodriguez, Greenberg & O'Keefe

(57) ABSTRACT

An illustrative embodiment provides a computer-implemented process for semantic verification of multidimensional data sources that receives a trusted output from a trusted multidimensional expression engine, receives an un-trusted output from an un-trusted data source and determines whether a query produces a correct semantic result, wherein the correct semantic result is within a predetermined tolerance. Responsive to a determination that the query does not produce a semantically correct result, identifies queries having semantically incorrect results to form a local subset, notifies a query planner of semantically incorrect queries and determines whether to process queries locally. Responsive to a determination to not process queries locally, creates a set of simplified multidimensional expression queries for remote execution.

20 Claims, 5 Drawing Sheets

SEMANTIC VERIFICATION OF MULTIDIMENSIONAL DATA SOURCES

CROSS-REFERENCE TO RELATED APPLICATIONS

This application claims priority under 35 U.S.C. §119(a) to Canadian Patent Application Serial Number 2686993, filed Dec. 3, 2009, entitled "SEMANTIC VERIFICATION OF MULTIDIMENSIONAL DATA SOURCES", the entirety of which is incorporated herein by reference.

BACKGROUND

1. Technical Field

This disclosure relates generally to querying of multidimensional data in a data processing system and more specifically to semantic verification of multidimensional data sources in a data processing system.

2. Description of the Related Art

Multidimensional expression query language (MDX) is a query language used with most multidimensional databases. The multidimensional data sources enable organization and manipulation of large volumes of data using data structures referred to as data cubes. A data cube includes multiple hierarchical dimensions wherein the dimensions have a number of levels and members capable of storing multidimensional data. The multidimensional expression query language is used by software applications to interface with the multidimensional data sources by building complex queries to retrieve and manipulate the extracted data.

Support for the multidimensional expression query language typically varies from database vendor to database vendor. A challenge for enterprise software systems which work with many different multidimensional databases is how to provide consistent behavior and analysis and reporting facilities to end users when such facilities do not necessary exist in the multidimensional expression query language query engine in the database system being queried.

The same semantic meaning in each system cannot be obtained when the same method or construct in one system means something slightly different in the other system. Differences in results occur because of minor differences in the interpretation of the multidimensional expression query language, often relating to how the database vendor constructed the respective software system. These differences can lead to an enterprise software system posing a query which is expected to have an intended result while the database system interprets the posed inquiry with a different semantic than expected.

Checking for semantic differences is largely a manual, person intensive process that is also prone to error and delay. Software developers require a capability to more easily create a software system which will support more data sources in an efficient manner which is not as prone to error.

BRIEF SUMMARY

According to one embodiment, a computer-implemented process for semantic verification of multidimensional data sources that receives a trusted output from a trusted multidimensional expression engine, receives an un-trusted output from an un-trusted data source and determines whether a query produces a correct semantic result, wherein the correct semantic result is within a predetermined tolerance. Responsive to a determination that the query does not produce a semantically correct result, identifies queries having semantically incorrect results to form a local subset, notifies a query planner of semantically incorrect queries and determines whether to process queries locally. Responsive to a determination to not process queries locally, creates a set of simplified multidimensional expression queries for remote execution.

According to another embodiment, a computer program product for semantic verification of multidimensional data sources is presented. The computer program product comprises a computer recordable-type media containing computer executable program code stored thereon. The computer executable program code comprises computer executable program code for receiving an un-trusted output from an un-trusted data source, computer executable program code for determining whether a query produces a correct semantic result, wherein the correct semantic result is within a predetermined tolerance, computer executable program code responsive to a determination that the query does not produce a semantically correct result, for identifying queries having semantically incorrect results to form a local subset, computer executable program code for notifying a query planner of semantically incorrect queries, computer executable program code for determining whether to process queries locally, and computer executable program code responsive to a determination to not process queries locally, for creating a set of simplified multidimensional expression queries for remote execution.

According to another embodiment, an apparatus for semantic verification of multidimensional data sources is presented. The apparatus comprises a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit executes the computer executable program code to direct the apparatus to receive a trusted output from a trusted multidimensional expression engine, receive an un-trusted output from an un-trusted data source, determine whether a query produces a correct semantic result, wherein the correct semantic result is within a predetermined tolerance, responsive to a determination that the query does not produce a semantically correct result, identify queries having semantically incorrect results to form a local subset, notify a query planner of semantically incorrect queries, determine whether to process queries locally, and responsive to a determination to not process queries locally, create a set of simplified multidimensional expression queries for remote execution.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Figure 1:
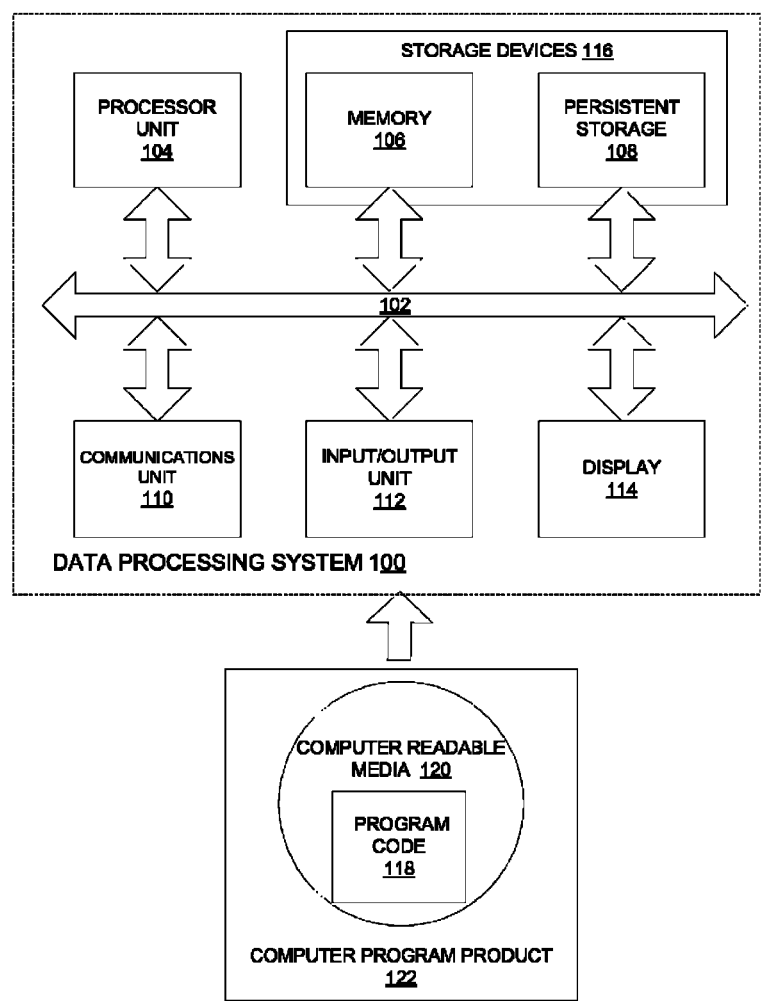
FIG. 1 is a block diagram of an exemplary data processing system operable for various embodiments of the disclosure.

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Computer program code for carrying out operations of the present disclosure may be written in any combination of one or more programming languages, including an object oriented programming language such as Java™, Smalltalk, C++, or the like and conventional procedural programming languages, such as the "C" programming language or similar programming languages. Java and all Java-based trademarks and logos are trademarks of Sun Microsystems, Inc., in the United States, other countries or both. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide processes for implementing the functions/acts specified in the flowchart and/or block diagram block or blocks.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110, input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The media used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 is located in a functional form on computer readable media 120 that is selectively removable and may be loaded onto or transferred to data processing system 100 for execution by processor unit 104. Program code 118 and computer readable media 120 form computer program product 122 in these examples. In one example, computer readable media 120 may be in a tangible form, such as, for example, an optical or magnetic disc that is inserted or placed into a drive or other device that is part of persistent storage 108 for transfer onto a storage device, such as a hard drive that is part of persistent storage 108. In a tangible form, computer readable media 120 also may take the form of a persistent storage, such as a hard drive, a thumb drive, or a flash memory that is connected to data processing system 100. The tangible form of computer readable media 120 is also referred to as computer recordable storage media. In some instances, computer readable media 120 may not be removable.

Alternatively, program code 118 may be transferred to data processing system 100 from computer readable media 120 through a communications link to communications unit 110 and/or through a connection to input/output unit 112. The communications link and/or the connection may be physical or wireless in the illustrative examples. The computer readable media also may take the form of non-tangible media, such as communications links or wireless transmissions containing the program code.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable media 120 are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

Illustrative embodiments provide a capability for consistent access to multidimensional data sources. Specifically the embodiments illustrate examples that provide a process of semantic verification for multidimensional expression query language data sources using a trusted multidimensional expression query language interpreter as a multidimensional expression engine and an un-trusted multidimensional expression query language data source. Using data processing system 100 of FIG. 1 as an example, processor unit 104 receives a trusted output from a trusted multidimensional expression engine from storage devices 116 or communications unit 110, receives an un-trusted output from an un-trusted data source through communications unit 110 and determines whether a query produces a correct semantic result. Responsive to a determination that the query does not produce a semantically correct result, wherein the correct semantic result is within a predetermined tolerance, processor unit 104 identifies queries having semantically incorrect results to form a local subset, notifies a query planner of semantically incorrect queries and determines whether to process queries locally. Responsive to a determination to not process queries locally, processor unit 104 creates a set of simplified multidimensional expression queries for remote execution. The set of simplified multidimensional expression queries for remote execution may be saved in memory 106 or persistent storage 108 of storage devices 116 or sent over communications unit 110.

Processor unit 104 further executes instructions stored in memory 106 or from persistent storage 108. Instructions may further be obtained through communications unit 110, or through input/output unit 112 in the form of program code 118. Processor unit 104 executes program code 118 to perform the sequence of operations just described.

In an alternative embodiment, program code 118 containing the computer-implemented method may be stored within computer readable media 120 as computer program product 122.

In another illustrative embodiment, the process for semantic verification of multidimensional data sources may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
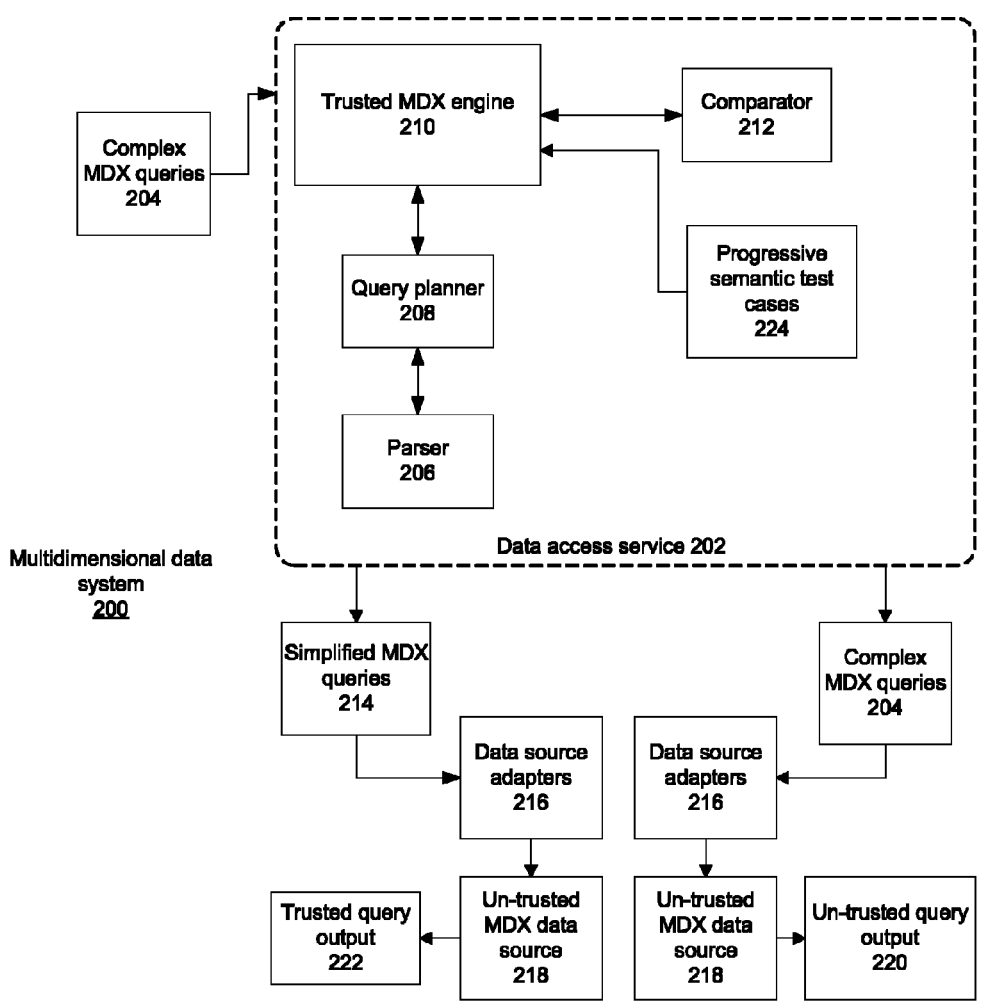
FIG. 2 is a block diagram of a multidimensional data system within the data processing system of FIG. 1, in accordance with various embodiments of the disclosure.

With reference to FIG. 2, a block diagram of a multidimensional data system within the data processing system of FIG. 1, in accordance with various embodiments of the disclosure is presented. Multidimensional data system 200 is an illustrative embodiment of an example of a multidimensional data system that may be implemented using data processing system 100 of FIG. 1.

Multidimensional data system 200 is comprised of a number of software, hardware and a combination of hardware and software components functioning in cooperation including data access service 202, complex MDX queries 204, simplified MDX queries 214, data source adapters 216, un-trusted MDX data sources 218, un-trusted query output 220 and trusted query output 222. Data access service 202 further comprises components including parser 206, query planner 208, trusted MDX engine 210, comparator 212 and progressive semantic test cases 224. The components of multidimensional data system 200 cooperatively process multidimensional data sources using a semantic verification process to provide typically more consistent results than a system would without semantic verification.

Data access service 202 provides the processing entity to accomplish semantic verification. Data access service 202 receives complex MDX queries 204 as input to parser 206. Parser 206 parses the input query stream according to multidimensional expression query language syntax to provide a parsed stream of query language constructs to query planner 208. Query planner 208 determines where to execute the stream of parsed query language constructs. For example, when a query is best suited for execution on a local execution engine, such as trusted MDX engine 210, query planner 208 will direct the query to that specific engine. In another example, when a query is best suited for execution on a remote execution engine, query planner 208 will direct the query to that specific engine.

Trusted MDX engine 210 is a multidimensional expression query language query engine which can perform any multidimensional expression query operation locally in multidimensional data system 200. Trusted MDX engine 210 supports all the query semantics that the users of an enterprise software system, such as multidimensional data system 200, expect. Therefore when trusted MDX engine 210 locally processes a complex multidimensional expression query language query the result will be as expected. Thus the local multidimensional expression query engine is trusted and correct. Continued update of progressive semantic test cases 224 is used to maintain the trust level of trusted MDX engine 210. Progressive semantic test cases 224 comprise a set of test cases wherein the set contains one or more test cases. As the testing operation progresses through the test cases, each case in succession becomes more difficult or complex than a previous case. For example, one case may test a single semantic element, whereas a subsequent test case tests a number of semantic elements together. The semantics may be tested in singles, multiples as well as in various combinations.

Comparator 212 provides a capability to compare a trusted result against an un-trusted result. An initial set of queries is generated, such as complex MDX queries 204 which exercise all required query semantics. The queries are then executed in two modes of operation. First a set of queries is executed through the local engine, simplifying the MDX query, and sending simplified MDX queries 214 to un-trusted data source 218 through data source adapters 216 to retrieve source level data and perform multidimensional expression query language semantic operations on the retrieved data to create a trusted query output 222.

Second, using a pass through mode of operation, un-simplified full multidimensional expression query language queries, as in complex MDX queries 204 are sent to an un-trusted multidimensional expression engine. Using the pass through mode, complex MDX queries 204 are sent through data source adapters 216 to process un-trusted MDX data source 218. The un-trusted query output 220 is received and compared with the previously obtained trusted query output 222.

Any difference indicates a semantic difference between the operations exercised in the test, such as those using progressive semantic test cases 224. Additional data structures of data source adapters 216 and un-trusted MDX data sources 218 are shown but not required to be duplicated and may be combined with the previous data structures as a set of common elements used by both modes of operation.

A difference further indicates local processing is required to compensate for a data source semantic difference. There is also a possibility that individual semantics are supported but certain combined semantics are not. Thus the progressive testing using progressive semantic test cases 224 also include testing of combinations of semantics that could cause issues.

Using comparator 212 the output received is compared to ensure numeric and member based values contained within the result correctly correspond to each other in both the trusted and un-trusted results. In some cases acceptable results means ignoring absolute precision in result values. For example, when using a floating-point calculation a predetermined number of significant digits may allow a tolerance of deviation rather than exact matching. In these situations "close enough" may be determined as an acceptable alternative. The variance allowed or tolerance is predetermined for each value tested. The output being compared is typically viewed as an array of bytes, names of things or objects, or cell values. Comparison results are further defined in terms of precision. Precision defines whether the output being compared must match exactly or within a tolerance.

Figure 3:
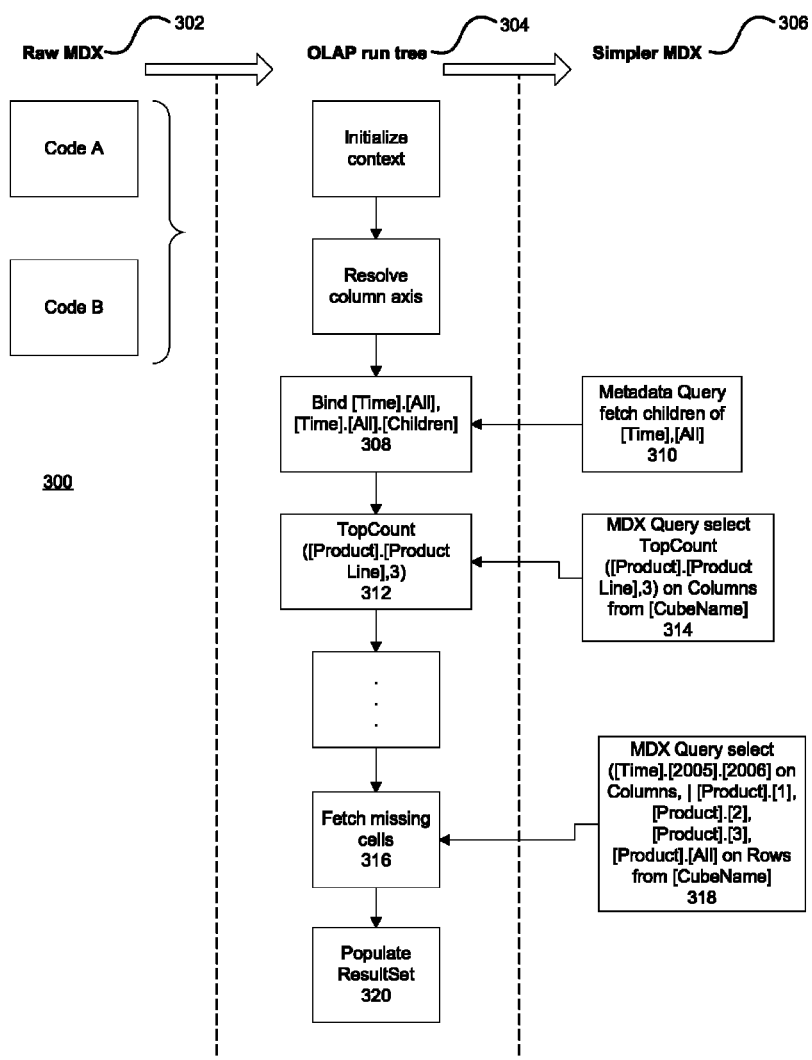
FIG. 3 is a block diagram depicting a simplification relationship when using multidimensional data system of FIG. 2, in accordance with various embodiments of the disclosure.

With reference to FIG. 3, a block diagram depicting a simplification relationship when using multidimensional data system of FIG. 2, in accordance with various embodiments of the disclosure is presented. Simplification representation 300 represents an overview of a relationship between the input source, process operations and simplified queries.

Simplification representation 300 contains raw MDX 302 that is representative of complex MDX queries 204 of FIG. 2. In the example provided there are two blocks of code contained within raw MDX 302 that is provided as input to the simplification process.

OLAP run tree 304 is a set of operations corresponding to an online transaction-processing phase that represents the MDX query of raw MDX 302. The input blocks of code from raw MDX 302 have been transformed into a set of online transaction-processing operations as in the example. Some of the operations are then mapped into respective data queries of simpler MDX 306.

For example a binding operation of Bind [Time]. [All], [Time].[All].[Children] 308 is mapped to a respective data query of Metadata Query fetch children of [Time],[All] 310. In another example, an operation to determine the top products as in TopCount ([Product].[Product Line], 3) 312 is mapped to a respective data query of MDX Query select TopCount ([Product].[Product Line], 3) on Columns from [CubeName] 314. In a further example in the same set of operations, missing cells are determined using operation fetch missing cells 316 that is mapped to a respective data query of MDX Query select ([Time].[2005].[2006] on Columns, | [Product].[1], [Product].[2], [Product].[3], [Product].[All] on Rows from [CubeName] 318. Completion of OLAP run tree 304 occurs with occurrence of populate Resultset 320.

Not all operations of OLAP run tree 304 are mapped to corresponding data queries of Simpler MDX 306. Only operations that are candidates for remote execution are mapped, thereby providing a simplification of raw MDX 302. For example the TopCount function requires access to all data for all products of all product lines but will return only the top three products. This function is therefore a candidate for remote processing because of the volume of data being accessed. The function can be processed locally but it makes sense to process more closely to the data. The TopCount function therefore identifies a remote execution branch in the run tree.

OLAP run tree 304 is examined to identify expressions that can be evaluated either locally or remotely. Expressions that are to be processed remotely are then pushed out to the remote data location for processing. Simplification therefore enables the expressions to be allocated between local and remote processing capabilities. Typically operations that are not handled uniformly across data service implementations would be candidates for local processing. Operations expected to have a variance from a trusted output are candidates as well for local processing to better ensure expected results.

Figure 4:
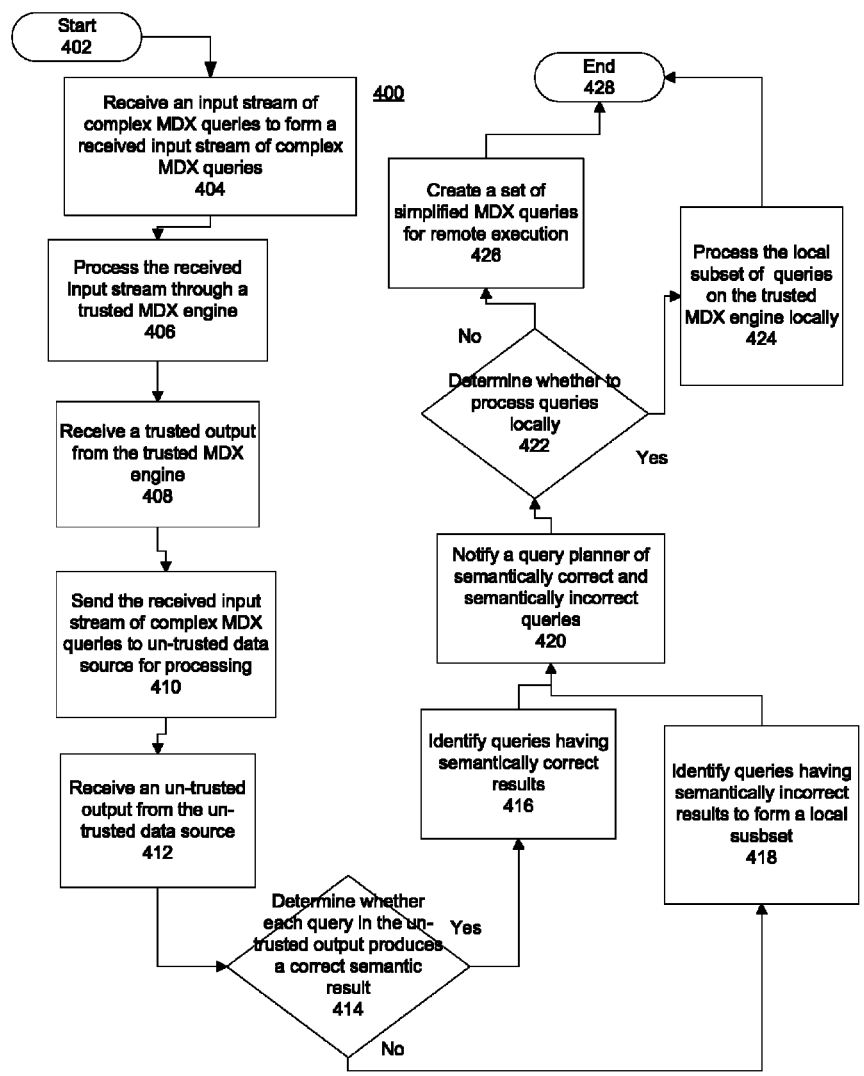
FIG. 4 is a flowchart of a semantic verification process using the multidimensional data system of FIG. 1, in accordance with various embodiments of the disclosure.

With reference to FIG. 4, a flowchart of a semantic verification process using the multidimensional data system of FIG. 2, in accordance with various embodiments of the disclosure is presented. Process 400 is an example of a semantic verification process using multidimensional data system 200 containing data access system 202 of FIG. 2.

Process 400 starts (step 402) and receives an input stream of complex multidimensional expression (MDX) query language queries (step 404). The input stream of complex multidimensional expression query language queries may be provided from a storage location or from a user entering queries through a user interface. For example, an input stream of complex multidimensional expression query language queries may be presented in the form of a set of progressive semantic test cases using complex multidimensional expression query language queries, such as progressive semantic test cases 224 of FIG. 2.

Process 400 processes the received input stream through a trusted multidimensional expression (MDX) engine (step 406). Receive trusted output from a trusted multidimensional expression (MDX) engine is performed (step 408). As stated previously, the trusted engine is a multidimensional expression query language query engine which can perform any multidimensional expression query operation locally in a multidimensional data system. The trusted multidimensional expression query language engine supports all the query semantics that users of the multidimensional data system expect. Therefore the results for all supported query semantics are trusted results.

Using the input stream again, send the input stream of complex MDX queries to an un-trusted data source for processing is performed (step 410). Process 400 receives an un-trusted output from processing with the un-trusted data source (step 412). Using the same input stream enables a comparison of results without concern that different inputs were used. Any difference in the results should be based on semantic differences of the query interpretation by the differing engines.

Process 400 uses a comparator to analyze the trusted results and the un-trusted results to determine whether each query in the un-trusted output produces a correct semantic result (step 414). When a determination is made that a query produces correct semantic results, a "yes" result is obtained. When a determination is made that a query does not produce correct semantic results, a "no" result is obtained. When a "yes" result is obtained instep 414, process 400 identifies queries having semantically correct results (step 416). When a "no" result is obtained instep 414, process 400 identifies queries not having semantically correct results, the queries having incorrect semantic results, to form a local subset of queries (step 418). For example, when using progressive semantic test cases 224 of FIG. 2, the operation of step 416 would identify the test cases that passed while the operation of step 418 would identify the test cases that failed.

Process 400 notifies a query planner of correct and incorrect queries (step 420). The query planner will use the information to direct a query to a desired execution location. Process 400 determines whether to process queries locally (step 422). Information provided to the query planner provides a capability to decide where to route a query based on whether the query passed or failed in step 414. For example, queries that are found to produce semantically correct results can be processed using a trusted engine or an un-trusted engine. Queries found to produce semantically incorrect results can be processed only using a trusted engine with additional processing. Determining whether the query produces a correct result is a result of a comparison, wherein the correct semantic result is within a predetermined tolerance. A predetermined tolerance value may be established and be different for each expression being evaluated.

When a determination is made to process queries locally, a "yes" is obtained in step 422. When a determination is made to not process queries locally, a "no" is obtained in step 422. When a "yes" is obtained, process 400 processes the local subset of queries on the trusted MDX engine locally (step 424) with process 400 terminating thereafter (step 328). When a "no" is obtained, process 400 creates simplified MDX queries for remote execution (step 426) with process 400 terminating thereafter (step 428).

Using process 400 provides a capability to selectively determine which queries in a set of complex multidimensional expression query language queries can be processed in an un-trusted data source to produce a trusted output result. While performing the analysis, a sub-set remaining from the set of complex multidimensional expression query language queries is identified as failing to produce semantically correct results and requires processing to be performed locally by the trusted multidimensional expression engine.

Figure 5:
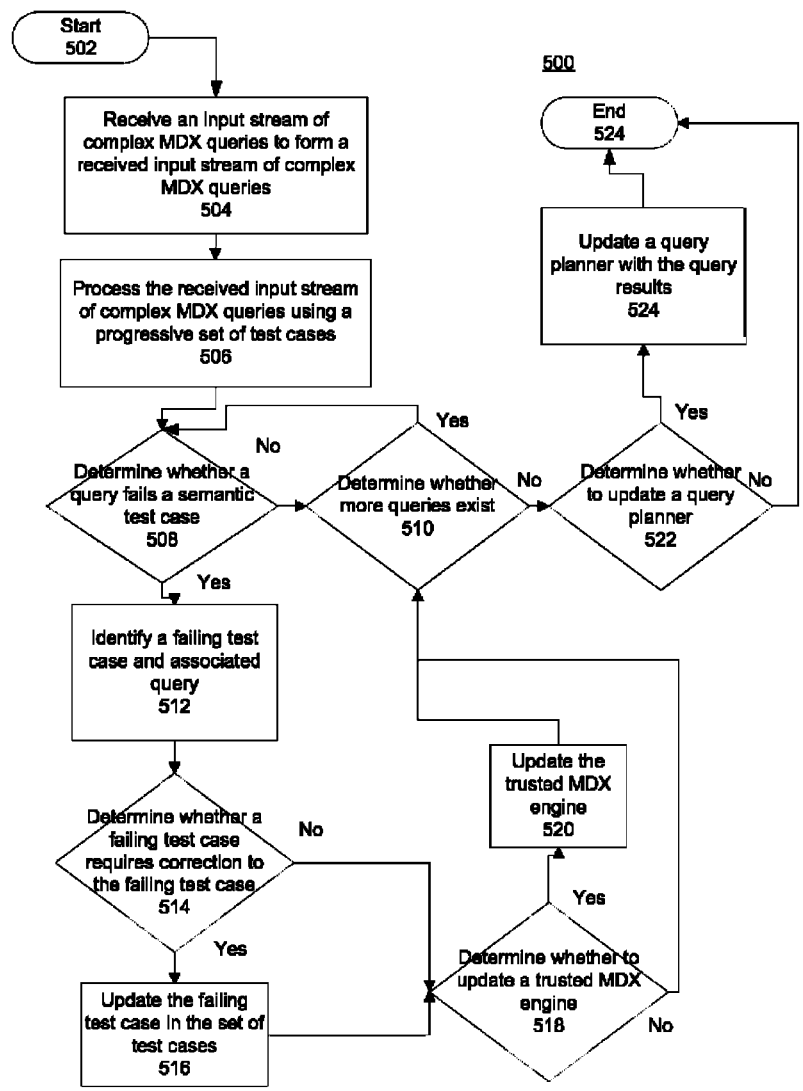
FIG. 5 is a flowchart of a semantic testing process used within the semantic verification process of FIG. 4, in accordance with various embodiments of the disclosure.

With reference to FIG. 5, a flowchart of a semantic testing process used within the semantic verification process of FIG. 4, in accordance with various embodiments of the disclosure is presented. Process 500 is a further detailed example of operations of process 400 performed to identify trusted and un-trusted query results.

Process 500 starts (step 502) and receives an input stream of complex multidimensional expression (MDX) queries to form a received input stream of complex multidimensional expression (MDX) queries (step 504). A set of complex multidimensional expression (MDX) queries in the received input stream may contain one or more queries.

Process 500 processes the received set of complex multidimensional expression (MDX) queries through a progressive set of test cases (step 506). For example, the test cases become progressively more complex and therefore difficult with respect to semantic requirements. Determine whether a query fails a test case is performed (step 508). Failure in this regard is with respect to meeting the semantic requirements of the test case. When a determination is made that a query fails a semantic test case, a "yes" result is obtained. When a determination is made that a query does not fail a semantic test case, a "no" result is obtained.

When a "no" result is obtained in step 508, process 500 determines whether more queries exist (step 510). When a determination is made that more queries exist, a "yes" result is obtained. When a determination is made that no more queries exist, a "no" result is obtained. When a "yes" exists, process 500 loops back to step 508 to process remaining queries. When a "no" is obtained in step 510, process 500 determines whether to update a query planner (step 522).

When a determination is made to update a query planner, a "yes" result is obtained. When a determination is made to not update a query planner, a "no" result is obtained. When a "yes" result is obtained in step 522, process 500 updates the query planner with the query results (step 524) with process 500 terminating thereafter (step 526). The query planner uses the information on successful and failing queries to determine an execution environment for an individual query. For example, queries identified as successful during semantic testing may be executed remotely while still providing trusted or expected results. Queries that are identified as failing the semantic testing require local processing by a trusted multi-dimensional expression (MDX) engine to ensure proper interpretation and therefore expected results. When a "no" result is obtained in step 522, process 500 terminates (step 526).

When a "yes" is obtained in step 508, process 500 identifies a failing test case and an associated query (step 512). Process 500 determines whether the failing test case requires a correction to the failing test case (step 514). When a determination is made that the failing test case requires a correction to the failing test case, a "yes" result is obtained. When a determination is made that the failing test case does not require a correction to the failing test case, a "no" result is obtained. For example, a failing test case may indicate a problem with the test case not previously anticipated and therefore requiring an update to be applied to the test case.

When a "yes" is obtained in step 514, process 500 updates the failing test case in the set of test cases (step 516) and proceeds to step 518. When a "no" result is obtained in step 514, process 500 determines whether to update a trusted MDX engine (step 518). For example, when a failed test case indicates a semantic requirement not previously considered, the multidimensional expression (MDX) engine needs to be updated to handle the discovered requirement. When a determination is made to update a trusted MDX engine, a "yes" result is obtained. When a determination is made not to update a trusted MDX engine, a "no" result is obtained.

When a "yes" result is obtained in step 518, process 500 updates the trusted multidimensional expression (MDX) engine (step 520). Process 500 loops back to perform step 510 as before. When a "no" result is obtained in step 518, process 500 loops back to perform step 510 as before.

Illustrative embodiments thus provide a computer-implemented process, a computer program product and an apparatus for semantic verification of multidimensional data sources that receives a trusted output from a trusted multidimensional expression engine receives an un-trusted output from an un-trusted data source and determines whether a query produces a correct semantic result, wherein the correct semantic result is within a predetermined tolerance. Responsive to a determination that the query does not produce a semantically correct result, identifies queries having semantically incorrect results to form a local subset, notifies a query planner of semantically incorrect queries and determines whether to process queries locally. Responsive to a determination to not process queries locally, creates a set of simplified multidimensional expression queries for remote execution.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for semantic verification of multidimensional data sources, the computer-implemented process comprising:
   receiving a trusted output from a trusted multidimensional expression engine;
   receiving an un-trusted output from an un-trusted data source;
   determining whether a query produces a correct semantic result, wherein the correct semantic result is within a predetermined tolerance;
   responsive to a determination that the query does not produce a semantically correct result, identifying queries having semantically incorrect results to form a local subset;
   notifying a query planner of semantically incorrect queries;
   determining whether to process queries locally; and
   responsive to a determination to not process queries locally, creating a set of simplified multidimensional expression queries for remote execution.

2. The computer-implemented process of claim 1, wherein receiving a trusted output from a trusted multidimensional expression engine further comprises:
   receiving an input stream of complex multidimensional expression queries to form a received input stream of complex multidimensional expression queries; and
   processing the received input stream of complex multidimensional expression queries through the trusted multidimensional expression engine.

3. The computer-implemented process of claim 2, wherein processing the received input stream of complex multidimensional expression queries through the trusted multidimensional expression engine further comprises:
   processing the received input stream of complex multidimensional expression queries through a progressive set of test cases;
   determining whether a query of the received input stream fails a semantic test case;
   responsive to a determination that the query fails the semantic test case, identifying a failing test case and associated query; and
   responsive to a determination that the failing test case requires correction to the failing test case, updating the failing test case.

4. The computer-implemented process of claim 3, wherein updating the failing test case further comprises:
   determining whether to update the trusted multidimensional expression engine; and
   responsive to a determination to update the trusted multidimensional expression engine, updating the trusted multidimensional expression engine.

5. The computer-implemented process of claim 1, wherein receiving an un-trusted output from an un-trusted data source further comprises:
   sending the received input stream of complex multidimensional expression queries to an un-trusted data source for processing.

6. The computer-implemented process of claim 1, wherein responsive to a determination that the query produces a semantically correct result:
   identifying queries having semantically correct results; and
   notifying a query planner of semantically correct queries.

7. The computer-implemented process of claim 1, wherein responsive to a determination to process queries locally, processing the local subset of queries on the trusted multidimensional expression engine.

8. A computer program product for semantic verification of multidimensional data sources, the computer program product comprising:
   a computer recordable-type medium containing computer executable program code stored thereon, the computer executable program code comprising:
   computer executable program code for receiving a trusted output from a trusted multidimensional expression engine;
   computer executable program code for receiving an un-trusted output from an un-trusted data source;
   computer executable program code for determining whether a query produces a correct semantic result, wherein the correct semantic result is within a predetermined tolerance;
   computer executable program code responsive to a determination that the query does not produce a semantically correct result, for identifying queries having semantically incorrect results to form a local subset;
   computer executable program code for notifying a query planner of semantically incorrect queries;
   computer executable program code for determining whether to process queries locally; and
   computer executable program code responsive to a determination to not process queries locally, for creating a set of simplified multidimensional expression queries for remote execution.

9. The computer program product of claim 8, wherein computer executable program code for receiving a trusted output from a trusted multidimensional expression engine further comprises:
   computer executable program code for receiving an input stream of complex multidimensional expression queries to form a received input stream of complex multidimensional expression queries; and
   computer executable program code for processing the received input stream of complex multidimensional expression queries through the trusted multidimensional expression engine.

10. The computer program product of claim 9, wherein computer executable program code for processing the received input stream of complex multidimensional expression queries through the trusted multidimensional expression engine further comprises:
    computer executable program code for processing the received input stream of complex multidimensional expression queries through a progressive set of test cases;

computer executable program code for determining whether a query of the received input stream fails a semantic test case;
computer executable program code responsive to a determination that the query fails the semantic test case, for identifying a failing test case and associated query; and
computer executable program code responsive to a determination that the failing test case requires correction to the failing test case, updating the failing test case.

11. The computer program product of claim 8, wherein computer executable program code for receiving an un-trusted output from an un-trusted data source further comprises:
computer executable program code for sending the received input stream of complex multidimensional expression queries to an un-trusted data source for processing.

12. The computer program product of claim 8, wherein computer executable program code responsive to a determination that the query produces a semantically correct result further comprises:
computer executable program code for identifying queries having semantically correct results; and
computer executable program code for notifying a query planner of semantically correct queries.

13. The computer program product of claim 8, wherein computer executable program code responsive to a determination to process queries locally further comprises:
computer executable program code for processing the local subset of queries on the trusted multidimensional expression engine.

14. The computer program product of claim 8, wherein computer executable program code for updating the failing test case further comprises:
computer executable program code for determining whether to update the trusted multidimensional expression engine; and
computer executable program code responsive to a determination to update the trusted multidimensional expression engine, for updating the trusted multidimensional expression engine.

15. An apparatus for semantic verification of multidimensional data sources, the apparatus comprising:
a communications fabric;
a memory connected to the communications fabric, wherein the memory contains computer executable program code;
a communications unit connected to the communications fabric;
an input/output unit connected to the communications fabric;
a display connected to the communications fabric; and
a processor unit connected to the communications fabric, wherein the processor unit executes the computer executable program code to direct the apparatus to:
receive a trusted output from a trusted multidimensional expression engine;
receive an un-trusted output from an un-trusted data source;
determine whether a query produces a correct semantic result, wherein the correct semantic result is within a predetermined tolerance;
responsive to a determination that the query does not produce a semantically correct result, identify queries having semantically incorrect results to form a local subset;
notify a query planner of semantically incorrect queries;
determine whether to process queries locally; and
responsive to a determination to not process queries locally, create a set of simplified multidimensional expression queries for remote execution.

16. The apparatus of claim 15, wherein the processor unit further executes the computer executable program code to receive a trusted output from a trusted multidimensional expression engine to direct the apparatus to:
receive an input stream of complex multidimensional expression queries to form a received input stream of complex multidimensional expression queries; and
process the received input stream of complex multidimensional expression queries through the trusted multidimensional expression engine.

17. The apparatus of claim 16, wherein the processor unit further executes the computer executable program code to process the received input stream of complex multidimensional expression queries through the trusted multidimensional expression engine to direct the apparatus to:
process the received input stream of complex multidimensional expression queries through a progressive set of test cases;
determine whether a query of the received input stream fails a semantic test case;
responsive to a determination that the query fails the semantic test case, identify a failing test case and associated query; and
responsive to a determination that the failing test case requires correction to the failing test case, update the failing test case.

18. The apparatus of claim 15, wherein the processor unit further executes the computer executable program code to receive an un-trusted output from an un-trusted data source to direct the apparatus to:
send the received input stream of complex multidimensional expression queries to an un-trusted data source for processing.

19. The apparatus of claim 15, wherein the processor unit further executes the computer executable program code responsive to a determination that the query produces a semantically correct result to further direct the apparatus to:
identify queries having semantically correct results; and
notify a query planner of semantically correct queries.

20. The apparatus of claim 15, wherein the processor unit further executes the computer executable program code responsive to a determination to process queries locally to further direct the apparatus to:
process the local subset of queries on the trusted multidimensional expression engine.

* * * * *